Aug. 14, 1962 T. G. SLATTERY ET AL 3,049,697

MAGNETIC MEMORY DEVICE

Filed Nov. 26, 1956 4 Sheets-Sheet 1

Inventors:
Bradford M. Torrey,
Thomas G. Slattery,
by Emery, Booth, Townsend, Miller & Weidner
Att'ys

MAGNETIC MEMORY DEVICE

Filed Nov. 26, 1956 4 Sheets-Sheet 2

Inventors:
Bradford M. Torrey,
Thomas G. Slattery,
by Emery, Booth, Townsend, Miller + Weidner Attys Inventors:
Bradford M. Torrey,
Thomas G. Slattery,
by Emery, Booth, Townsend, Miller, + Weidner
Att'ys Aug. 14, 1962 T. G. SLATTERY ET AL 3,049,697

MAGNETIC MEMORY DEVICE

Filed Nov. 26, 1956 4 Sheets-Sheet 4

Inventors:
Bradford M. Torrey,
Thomas G. Slattery,
by Emery, Booth, Townsend, Miller & Weidner
Att'ys United States Patent Office 3,049,697

Patented Aug. 14, 1962

3,049,697
MAGNETIC MEMORY DEVICE

Thomas G. Slattery, Wellesley Hills, and Bradford M. Torrey, Arlington, Mass., assignors to Automation, Inc., Wellesley Hills, Mass., a corporation of Massachusetts Filed Nov. 26, 1956, Ser. No. 624,454
1 Claim. (Cl. 340—174.1)

This invention relates to a signal storage or memory unit or device of the magnetic type, and providing a new and improved read head which is characterized by high resolution, sensitivity to low level signals, and an output readily amplified for control application.

The invention will be better understood from a consideration of the following specification taken in conjunction with the accompanying drawings in which:

FIG. 7 is a block diagram of the electrical control and connection of the invention components in a representative control unit.

The memory of this invention will be seen to employ a read head comprising a magnetic flux detector sensitive to low level magnetic flux conditions, and so capable of high resoltuion. As distinguished from magnetic flux detectors whose output signal is continuous and where the average value of that signal is proportional to the magnetic flux being detected, the novel detector herein produces an output signal of discontinuous or pulse form, such output signal having higher instantaneous peak values but the same average value and the width and amplitude of its short duration voltage pulses being functions of the amplitude of the magnetic energy stored in the disc, whereby the read head output may be detected by a peak signal amplifier. The magnetic memory is thus afforded a substantially increased resolution, and a read head output which is easily amplified, as for control purposes.

Figure 1:
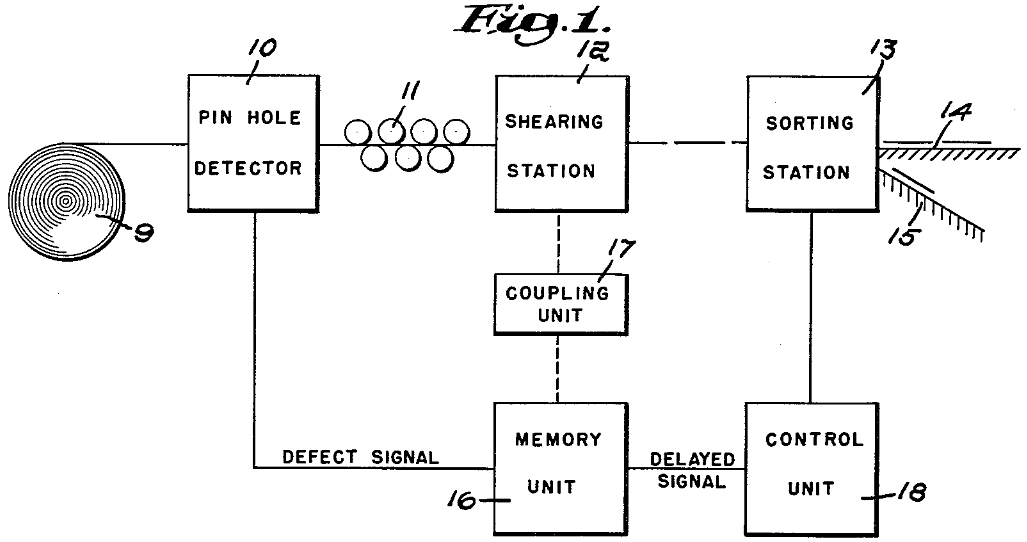
FIG. 1 is a schematic showing of a representative arrangement and application of the invention apparatus.

A material processing operation to which the memory and read head apparatus of the invention has exemplary application is shown in FIG. 1 as the shearing of a continuous length or band of steel strip 9 into sheets, as for cans. A coil or roll of the strip 9 is seen as unwound and carried first through an inspection station where it is examined, as herein by a conventional pin hole detector 10, for a characteristic or condition for the presence or absence of which it is later to be rejected or accepted. The strip 9 is next advanced by or between straightening rolls 11 to the shearing station 12 where it is cut into the desired blanks or sheets. The sheets are then carried as by belts or other conventional conveyor means to the action station at which a sorter 13 effects the desired classifying of the sheets into perfect and imperfect groups, as for deposit selectively in acceptance and reject chutes 14, 15. This described operation of a representative processing line will be understood to require actuation of the sorter 13 for rejection of the same strip length or sheet as found defective at the inspection station, and in synchronism with its arrival at the action station.

Referring still to FIG. 1, the timed, delayed control or actuation of the sorter 13 is accomplished by a magnetic memory unit 16 as governed or supplied by a control unit 18. Generally considered, and as appearing also from FIG. 7, the memory unit 16 is connected to receive the electrical signal generated by the detector 10, upon its sensing a pin hole. The defect signal is written into the memory unit and there delayed, stored or remembered during the period or time required for advance of the defective sheet to the action station. The delayed signal is then automatically read out of the memory unit 16 and fed to the control unit 18, where it is amplified and converted to the reject signal which is employed for actuating sorter 13.

Figure 2:
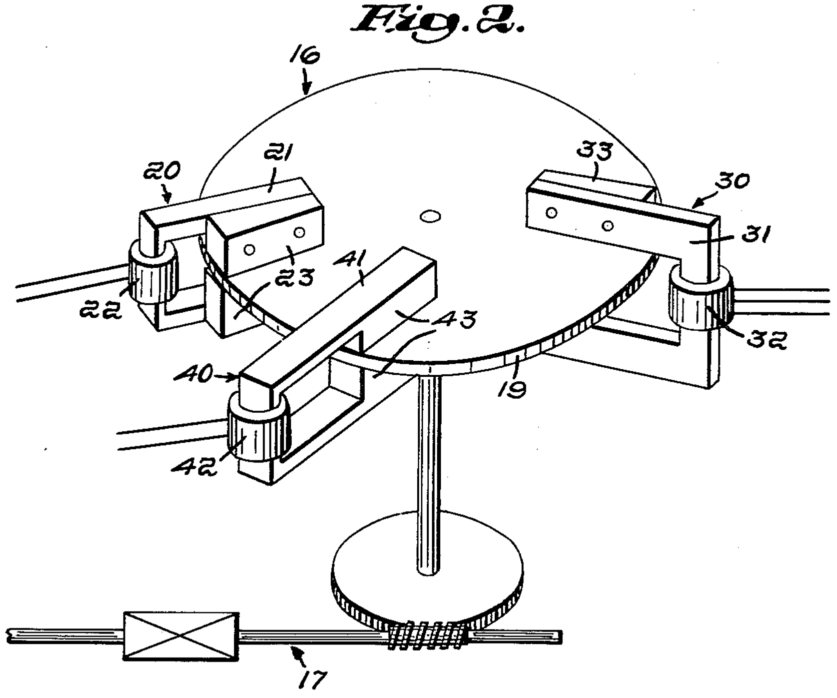
FIG. 2 is a perspective of the magnetic memory unit.

The magnetic memory of the invention is shown more particularly in FIG. 2 to comprise a hardened steel disc 19 of, say, 0.2 in. thickness, and which will be understood to be formed from a permanent magnet material which preferably is one selected to have a high product of coercive force times magnetic permeability, thereby providing a medium in which a high level of energy may be efficiently and easily stored. Exemplary of the materials meeting these qualifications is Alleghany Ludlam High Speed Tool Steel DEL–2. Spaced around the disc 19 are a signal introducing or write head 20, a signal reproducing or read head 30, and a signal cancelling or erase head 40. These magnetic heads 20, 30, 40 are seen generally to comprise yokes 21, 31, 41 extending radially inward above and below the disc 19, and mounting the coils 22, 42 and the core 32, as hereinafter more fully to be described.

These writing, reading, and erasing heads 20, 30, 40 will be seen to be without physical contact with the disc 19, and so entirely free from mechanical friction wear. Further, the described disc embracing arrangement of the magnetic heads results in the write coil 22 and erase coil 42 generating magnetic paths which pass directly through the memory disc 19 from one side to the other, and in the generation by the memory disc of a magnetic flux which passes through the read head assembly 31 and core 32.

The signal introducing and reproducing heads 20, 30 are provided with removable writing and reading tips 23, 33. Accordingly, and by the selection of tips of proper width, the area of the medium being written into and read out of may be varied or adjusted for storage of maximum energy compatible with high resolution.

Considering now more particularly the read head 30, the same is herein shown to comprise a detector means or yoke 31 arranged for interception of the flux produced by the magnetized portion of or the signal stored in disc 19, and with its tips 33 formed of a low reluctance, magnetically soft material, conveniently a fully annealed, cold rolled low carbon steel material such as that sold under the name Permendur by the Alleghany Ludlam Company, whereby to provide the desired magnetic path for said flux.

The read head detector or reproducer 30 comprises further a closed core or loop arranged for introduction thereinto of the magnetic flux carried by the low reluctance yoke 31. In the FIG. 3 form of the invention the closed loop is an annular ring 32 aligned and supported between the complementary faces of the yoke sections as shown. In the alternative embodiment of FIG. 4 the core or loop comprises the sections or legs 32*a*, 32*a* oppositely supported between the spaced low reluctance elements or plates 31*a*, 31*a*.

In both invention forms the yoke or plate and core or loop elements of the read head will be understood to be securely held together, as by any suitable nonmagnetic bolt or screw means such as are wholly conventional and therefore not shown.

Further in accordance with the invention, the read head core or loop provides two or more magnetic paths from one to the other of the yoke portions, and is formed at least in its said two path parts of a ferromagnetic material having magnetic characteristics different from those of the material from which the yoke is formed, namely, a material selected for both easy saturation and square B—H loop characteristics.

A suitable one of such easily saturable, square B—H characteristic materials is that identified and sold as Ferramic S1 by the General Ceramics Corporation of Keasbey, New Jersey.

Figures 3, 4:
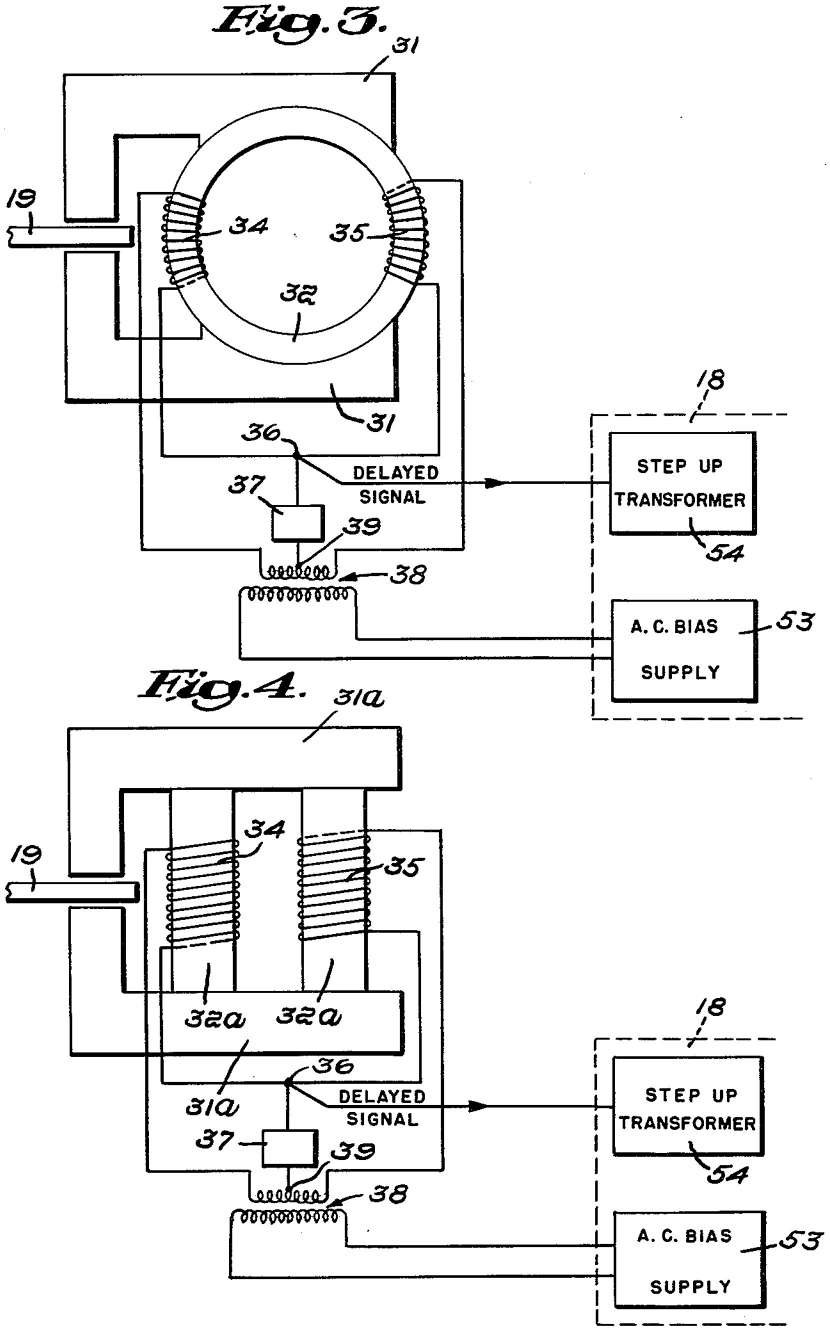
FIG. 3 illustrates the arrangement and electrical connection of the magnetic detector or read head of the invention.
FIG. 4 shows the modified construction and similar connection of an alternate form of the read head.

Referring now again to the two magnetic paths afforded by the closed loop, these will be seen in the FIG. 3 form to comprise spaced segments of the easily saturable ring 32. In the alternative embodiment of FIG. 4 the paths are of course defined by the legs 32*a*, 32*a* as closed in the loop by the portions of the yokes 31*a*, 31*a* which engage and span between their ends.

Further with respect to the construction and arrangement of the read head hereof, the aforementioned core or loop portions of square B—H characteristic material and defining the two magnetic paths have first and second or left and right hand exciting or biasing windings 34, 35. These A.C. bias windings 34, 35 have the same number of turns and the same impedance, and they are indicated also as arranged and connected such that the magnetomotive force generated by one produces flux which is in the same direction around the closed path containing the ferromagnetic element or elements as the flux produced by the magnetomotive force generated by the other said winding. Referring still to FIGS. 3 and 4, the common point 36 of these coils is shown as connected across load impedance 37 to the center tap point 39 of the A.C. biasing transformer 38. In view of the mentioned identicality of impedance of the coils 34, 35, it will be seen that the potentials of the common point 36 and center tap point 39 are also equal and no output signal is produced, in the absence of an external magnetomotive force as caused by a signal stored in memory disc 19.

But when a magnetomotive force is applied by the signal stored in the memory disc 19 a flux is caused to pass through low reluctance path 31 and upon reaching the ferromagnetic core 32 or legs 32*a* splits into two essentially equal halves going oppositely around the loop containing these ferromagnetic element or elements and causing a like magnetomotive force drop across each side. More particularly, and at a given instant, a direct magnetomotive force is produced which is combined with the alternating magnetomotive force on one, say the left, side and opposed to the alternating magnetomotive force on the other, say the right, side.

Further in accordance with the invention, the equal alternating magnetomotive forces are of such amplitude that when the magnetomotive force from a signal stored on the disc is added, flux reversal of one side occurs relatively earlier in the A.C. bias timing cycle and the flux reversal on the other side will occur relatively later in the timing cycle since the A.C. bias and the stored-signal-created magnetomotive forces subtract on this second side. Therefore the circuit becomes unbalanced, the potential of the common coil point 36 is made to depart from zero, and a voltage pulse is generated across the output impedance 37. This unbalance will of course occur twice during the period of the A.C. exciting signal resulting in two voltage pulses between points 36 and 39 of the same polarity, the polarity being determined by the direction of the direct magnetomotive force applied by the disc.

From the foregoing description the invention flux detector 30 will be understood to comprise a closed ferromagnetic element path linked by both A.C. windings, and wherein the alternating flux does not pass through a magnetic flux influenced air gap, but rather remains in the closed loop itself.

Figure 6:
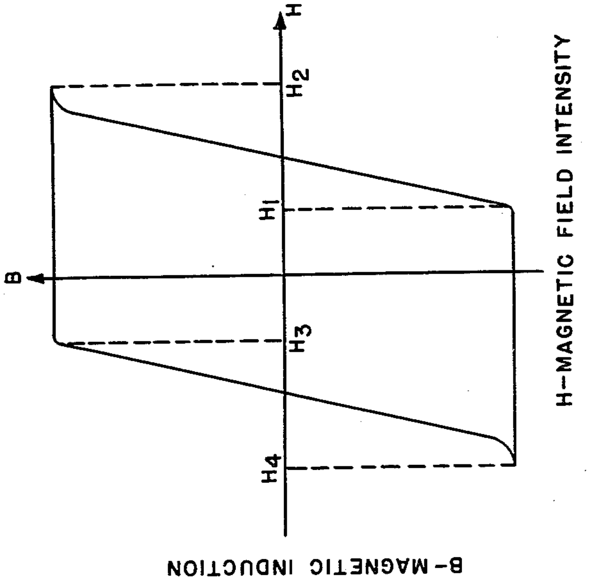
FIG. 6 is a graph of the B—H characteristic of a saturable ferromagnetic core of square loop type.
Figure 5:
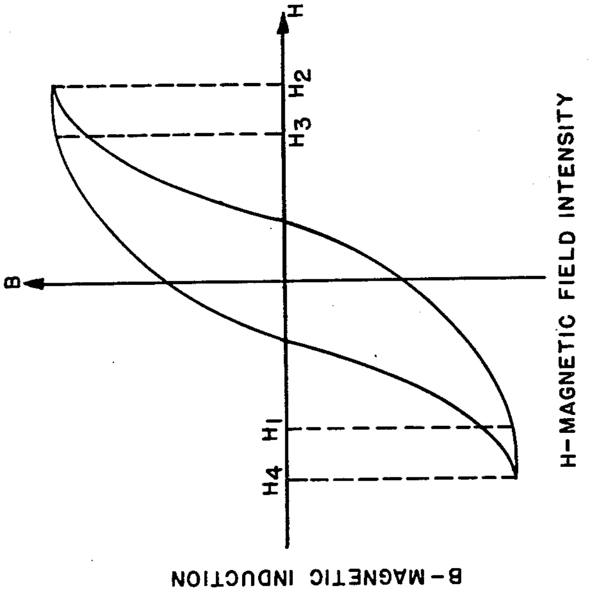
FIG. 5 is a graph of the B—H characteristic of a saturable ferromagnetic core of non-square loop type.
Figure 3:
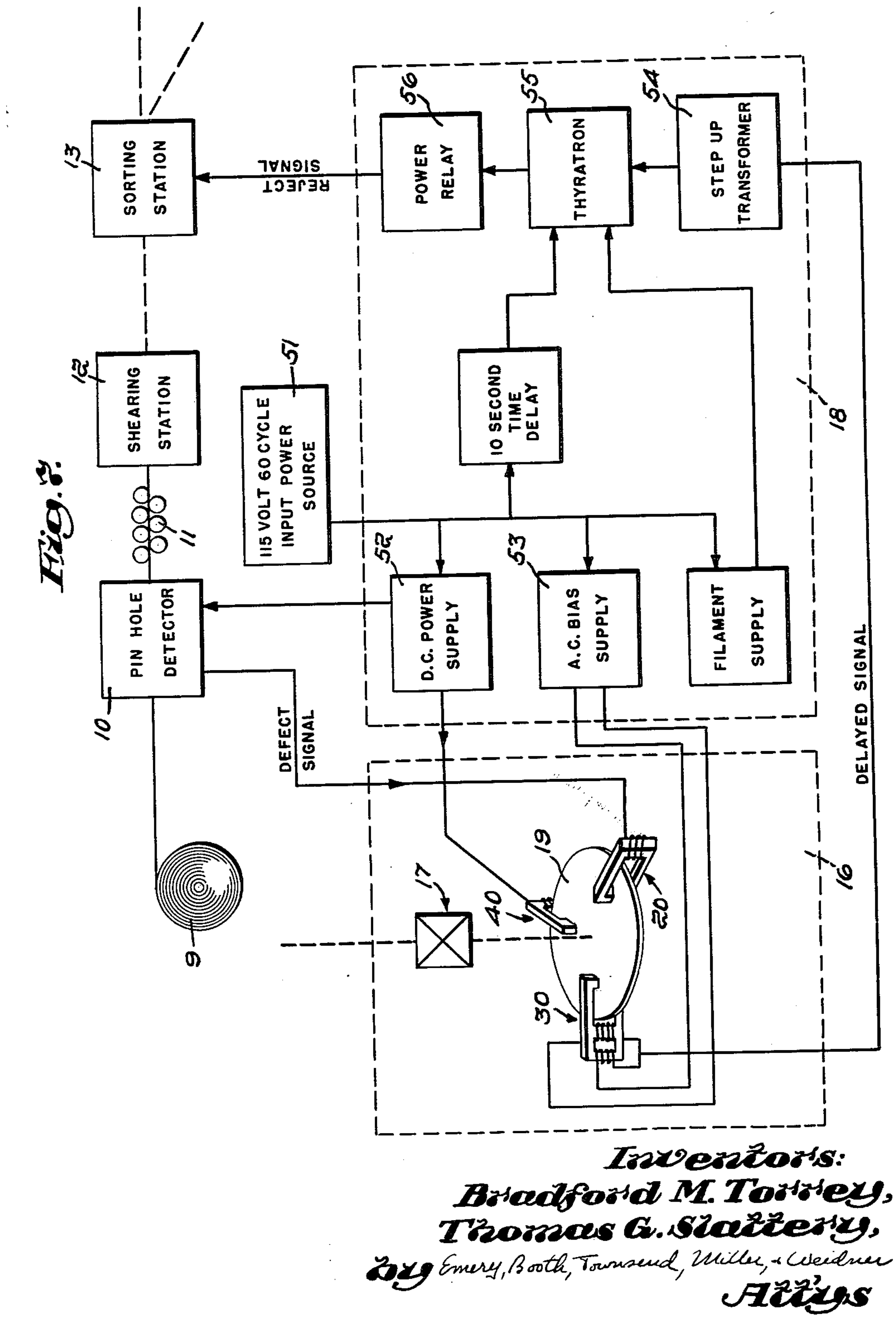

The novel electromagnetic read head configuration herein is distinguished further by concentration of the output signal, indicating the amplitude of the magnetic field, into short voltage pulses. This production of pulsed signals whose duration is proportional to the strength of the magnetomotive force applied by the memory disc 19 is accomplished by the use in the closed loop 32 of a ferromagnetic material of square loop characteristic. The forming, by the selection of a square loop core, of the detector output as the desired short duration peak pulses is illustrated by FIGS. 5 and 6, wherein are indicated the B—H curves for different ferromagnetic materials both saturating at the same values of B and H, but of which one, FIG. 5, is a non-square loop material, whereas the other, FIG. 6, exhibits the square loop characteristic. As is well understood by those skilled in the art the pulse rise and fall times of the output signals is dependent upon the differences in saturating magnetic intensities, which may be expressed as $H_2—H_1$, $H_4—H_3$. As will be obvious from the drawings these magnetic intensity differences are much lower for the square loop core of FIG. 6 than for the non-square loop core of FIG. 5. Also the output amplitude from the square loop path material herein is relatively constant if the A.C. bias magnetomotive forces are adequate to ensure flux reversal on each half cycle. The pulse width will be nearly proportional to the strength of the magnetomotive force applied by the disc; then since extremely short duration pulses are less effectively propagated through devices having inherent capacitances and inductances, the apparent outward result is a train of pulses whose amplitude and polarity are a measure of the amplitude and polarity of the magnetomotive force applied by the memory disc.

Thus by reason of its fitting with the saturating square loop material path 32 and of its construction and arrangement otherwise as just also shown and described, the magnetic read head output is concentrated as short, high level pulses. This peak signal output will be understood to be substantially higher than that of a conventional second harmonic type of read head configuration producing, for the same input, the same average power output, but whose output level is the average read head output signal, timed over one or more half periods of the A.C. biasing signal, rather than concentrated in short duration pulses as described above.

The herein described electrogmagnetic detector configuration is thus seen to permit detection of the much larger discontinuous charges in pulse signals, rather than requiring amplification of the relatively small average output of continuous signal changes. Thus the read head of this invention is additionally advantaged in that it may easily be coupled to amplifying devices by transformers and then amplified by voltage level sensitive amplifiers such as are arranged to amplify only signals that are above a predetermined level. The short, peak pulse output of the invention read head is seen further to impart to the magnetic memory a higher resolution, in that with the square loop core the resolution is essentially limited to the minimum time required to drive the read head from positive to negative saturation. Thus more individually distinguishable signals are permitted to be stored on the memory disc.

Referring now more particularly to FIG. 2 the erase head 40 herein employed will be seen similarly as the write and read heads 20, 30 to comprise a yoke 41 embracing the memory disc 19 and mounting erase coil 42 and on its radially inwardly extending arms the erasing tips 43. The operation of erase head 40 will be understood simply as the application, through the coil 42, of a signal, herein D.C. and of opposite polarity to that impressed by the write head 20, although in other applications A.C. erase signals may be used, whereby the magnetic marks written by said write head are erased from the disc 19 as said marks are rotated under the erase head 40. It will be appreciated that the section of the memory disc thus erased is thereby made available for writing over, when such section completes its revolution and arrives again at the write head.

Considering now further a typical relay or memory unit control and connection such as finding exemplary illustration in FIG. 7, power is seen generally to be supplied by the control unit 18 to the gauging means at the inspection station, to the read head for reading the magnetic marks placed on the memory disc by the write head, to the erase head for cancelling said magnetic marks, and to the amplification and the relay means whereby the read head output is converted to the reject signal which actuates the material handling means at the action station. To this end the control unit 18 is herein connected to a 115 volt 60 cycle input power source 51, and incorporates a D.C. power supply 52 connected as shown to the detector 10 whereby its sensing of a pin hole is expressed as the desired positive polarity electrical signal. The pin hole detector 10 is connected as shown to the write head coil 22 whereby its generation of the positively polarized electrical signal sets up a magnetic flux within the write head. This flux passes through the memory disc and places there a positive polarity magnetic mark which remains in the disc after the write signal is turned off, or after the disc section on which the mark is impressed rotates from beneath the write head. As hereinbefore pointed out, the rotation of the memory disc is synchronized with the advance of the strip or sheets 9, whereby a defective or pin-holed sheet arrives at the action station 13 simultaneously with the carrying of the magnetic mark under the read head 30.

This rotation of the memory disc 19 in synchronism with the advance of the process line is accomplished through a coupling unit and drive shaft arrangement or assembly such as indicated generally and schematically at 17, FIGS. 1 and 2. While the coupling unit 17 may be of a direct type, as employing belts, gears or the like, it may also take indirect form, incorporating electrical, pneumatic or hydraulic servos or the like. Whatever its construction the input shaft or other memory unit drive apparatus 17 is such as to rotate the disc 19 in timed synchronism with the advance of the strip 9. And in any case, as hereinbefore pointed out, it may be such as is freely variable with the process line, and is unrestricted also by insensitivity of the magnetic memory to detect signals generated substantially at zero line speed.

Further with regard to the control unit 18, the same is seen to incorporate also the A.C. biasing supply 53 connected to core 32 whereby when the defect mark or flux passes under the read head a signal is generated across output impedance 37. This read head output signal is shown in FIG. 7 to be conducted in the control unit through a step up transformer 54 to fire a single thyratron or other vacuum tube amplifier 55, such as capable of closing a power relay 56 which then activates sorter gate 13 to deposit the defective sheets in the reject chute 15. Thus it is seen that by the design of the memory for high level energy storage and for detector sensitivity to amplitude and polarity of magnetic flux rather than rate of change of magnetic flux, a read head output signal is produced which, no matter how fast or slow the line is moving, is of such form and power as may be raised to the tens of watts level as herein by a single thyratron or equivalent power amplifier.

It will be appreciated that without departing from the invention, the memory unit apparatus may be embodied in various equivalent forms not requiring illustration herein. The write head 20 may be adapted to accept signals from various forms and types of measuring devices. Thus the write and read heads 20, 30 may alternatively be of a known proportional type, whose write head mark and read head output is proportional to the electrical signal of the measuring device. The invention apparatus may also be adapted to a process line having multiple inspection or measurement stations, as would be required where the presence or thickness of a coating only is to be detected or measured, or examination separately of the top and bottom sides of a sheet is to be made, at successive inspection stations differently spaced, along the process line, from the action station. It will be apparent that in such multiple inspection cases a like plurality of like polarity write heads could be used, each in association with an inspection station, whereby only one read head would be required for detection of the magnetic marks placed on the disc by the several write heads.

The invention permits application of the memory unit also to a process line involving the sorting of two different kinds of material, at two different remote places and wherein one kind would be directed down one and the other kind directed down another branch conveyor line. For such application the write heads might be differently connected, to impress on the memory disc a magnetic mark of positive polarity identifying the one item and a mark of negative polarity as identifying the other item. In association with these opposite polarity write heads would be a single read head combined with an amplifier sensitive only to positively polarized marks, for generating the sort signal for the first branch conveyor line, and the same or a separate read head combined with an amplifier sensitive only to negative polarized marks, for generating the sort signal for the other branch conveyor line. It will be apparent also that even in this case a single erase head, with an A.C. supply to the erase coil, could be used.

In yet another type of multiple detector application there might be employed read and write heads whose tips are differently spaced, radially of the memory disc, whereby the magnetic marks representing the several defect signals are recorded on as many different radius ring paths on the memory disc. In such a construction the write and read head tips would be of course shaped to magnetically polarize only the disc area directly beneath the appropriate writing and reading heads.

And in this as well as other cases a cylinder could be used as the memory medium, with the magnetic paths passing directly through its walls, and having always the same effective radius.

The magnetic memory of this invention provides a static or direct flux detector type read head which is responsive to the amplitude and polarity rather than to the rate of change of magnetic flux, and so produces output signals at all line speeds, and also irrespective of variation in the speed of the process line. The read head is distinguished also by an output in the form of a short duration pulse, whereby lower level signals are detected, and shorter process line lengths are discriminated.

The present memory is designed in addition to provide maximum volume of magnetic material in which energy may be stored, without sacrificing resolution, whereby the defect signal is represented in the memory by a high level of energy, and may be reproduced as a reject signal with minimum amplification. More particularly, the detector output signal has been indicated as of such power that it may be raised to the tens of watts level by a single thyratron or equivalent power amplifier.

It will be understood that our invention is not limited to the particular embodiments thereof illustrated and described herein, and we set forth its scope in our following claim.

We claim:

In a magnetic memory device, a read head comprising a direct flux detecting means formed of a low reluctance material affording a magnetic path for the flux, a flux loop supported by said means for providing two spaced parallel flux paths and for supply thereto of said flux, said loop formed of an easily saturable ferro-magnetic material of square loop B-H characteristic, first and second windings linking said loop paths, said windings of equal impedance and having the same number and direction of turns and whereby to produce magnetic flux of the same direction and intensity in said loop including said parallel paths, and means connected to said winding for producing an alternating saturating flux in said loop, said saturating flux adding to the direct flux in one of said paths and subtracting from said direct flux in the other of said paths and whereby to produce across one of said windings separate, short, high amplitude voltage pulses whose width and polarity correspond respectively to the magnitude and direction of said direct flux.

References Cited in the file of this patent

UNITED STATES PATENTS

| | | |
|---|---|---|
| 2,433,685 | Dowell | Dec. 30, 1947 |
| 2,608,621 | Peterson | Aug. 26, 1952 |
| 2,674,660 | Ambrose | Apr. 6, 1954 |
| 2,729,214 | Brockhuysen et al. | Jan. 3, 1956 |
| 2,773,596 | Bartlett | Dec. 11, 1956 |
| 2,805,408 | Hamilton | Sept. 3, 1957 |
| 2,830,130 | Greenwood | Apr. 8, 1958 |
| 2,855,464 | Wiegand | Oct. 7, 1958 |
| 2,901,549 | Serrell | Aug. 25, 1959 |
| 2,933,718 | Arsenault | Apr. 19, 1960 |

FOREIGN PATENTS

| | | |
|---|---|---|
| 737,497 | Great Britain | Sept. 28, 1955 |
| 203,271 | Australia | July 5, 1956 |
| 752,415 | Great Britain | July 11, 1956 |